(12) United States Patent
Hall et al.

(10) Patent No.: US 10,921,761 B2
(45) Date of Patent: Feb. 16, 2021

(54) POWER DROP ASSEMBLY WITH PROCESSOR AND MEMORY

(71) Applicants: David R. Hall, Provo, UT (US); Jerome Miles, Spanish Fork, UT (US); Christopher Jones, Spanish Fork, UT (US); Casey Webb, Spanish Fork, UT (US); Justin Robinson, Provo, UT (US)

(72) Inventors: David R. Hall, Provo, UT (US); Jerome Miles, Spanish Fork, UT (US); Christopher Jones, Spanish Fork, UT (US); Casey Webb, Spanish Fork, UT (US); Justin Robinson, Provo, UT (US)

(73) Assignee: Hall Labs LLC, Provo, UT (US)

( * ) Notice: Subject to any disclaimer, the term of this patent is extended or adjusted under 35 U.S.C. 154(b) by 80 days.

(21) Appl. No.: 15/886,072

(22) Filed: Feb. 1, 2018

(65) Prior Publication Data

US 2019/0004486 A1  Jan. 3, 2019

Related U.S. Application Data

(60) Provisional application No. 62/526,523, filed on Jun. 29, 2017.

(51) Int. Cl.
*G05B 15/02* (2006.01)
*H02G 11/02* (2006.01)
(Continued)

(52) U.S. Cl.
CPC ............ *G05B 15/02* (2013.01); *B65H 75/446* (2013.01); *B65H 75/4449* (2013.01);
(Continued)

(58) Field of Classification Search
CPC ........ H02G 11/00; B65H 75/00; G05B 15/00; G05F 1/00
(Continued)

(56) References Cited

U.S. PATENT DOCUMENTS 6,433,274 B1 *  8/2002  Doss ..................... H01R 13/72
                                                        174/50
7,324,006 B2 *  1/2008  Godard ............. H01R 13/6683
                                                        340/635

(Continued)

*Primary Examiner* — Rexford N Barnie
*Assistant Examiner* — Joseph N Inge (57) ABSTRACT

There is disclosed a power drop assembly which includes a housing and a reel positioned and rotatable within it. Preferably, the device determines, not only whether power is available, but how much power is available. Preferably, the power drop assembly also contains a processor and non-transitory storage medium, so that user settings and profiles as well as settings and profiles for the power drop assembly can be stored and run. Additionally, the power drop assembly preferably contains a wireless transceiver which connects to a home Wi-Fi network and then to a cloud account, user profiles and settings, and settings and profiles for the power drop assembly can be saved on the cloud account. In this way multiple users can use the power drop assembly without contradicting instructions or resetting the power drop assembly every time it is used.

20 Claims, 10 Drawing Sheets

(51) Int. Cl.
  *B65H 75/44*   (2006.01)
  *F21V 21/38*   (2006.01)
  *F21V 33/00*   (2006.01)
  *G05F 1/66*    (2006.01)
  *H01B 7/06*    (2006.01)
  *H01B 9/00*    (2006.01)
  *H01H 63/36*   (2006.01)
  *H01R 13/46*   (2006.01)
  *H01R 13/70*   (2006.01)

(52) U.S. Cl.
  CPC ..... *B65H 75/4484* (2013.01); *B65H 75/4486* (2013.01); *F21V 21/38* (2013.01); *F21V 33/00* (2013.01); *G05F 1/66* (2013.01); *H01B 7/06* (2013.01); *H01B 9/00* (2013.01); *H01H 63/36* (2013.01); *H01R 13/46* (2013.01); *H01R 13/70* (2013.01); *H02G 11/02* (2013.01); *B65H 2701/34* (2013.01)

(58) Field of Classification Search
  USPC .......................................................... 307/31
  See application file for complete search history.

(56) References Cited

U.S. PATENT DOCUMENTS

| | | | |
|---|---|---|---|
| 7,815,332 B1* | 10/2010 | Smith | F21V 21/002 |
| | | | 362/133 |
| 9,537,266 B1* | 1/2017 | Leach | H01R 25/003 |
| 10,183,586 B1* | 1/2019 | Appelbaum | B60L 53/16 |
| 2011/0149455 A1* | 6/2011 | Ueno | B60L 53/31 |
| | | | 361/87 |
| 2011/0172839 A1* | 7/2011 | Brown | B60L 11/1809 |
| | | | 700/292 |
| 2013/0032654 A1* | 2/2013 | Tracey | H02G 3/02 |
| | | | 242/390.8 |
| 2014/0210989 A1* | 7/2014 | Olsson | G01N 21/954 |
| | | | 348/84 |
| 2015/0001937 A1* | 1/2015 | Wang | H01R 31/065 |
| | | | 307/52 |
| 2015/0012763 A1* | 1/2015 | Cohen | H04L 67/125 |
| | | | 713/310 |
| 2015/0073613 A1* | 3/2015 | Li | G06Q 50/06 |
| | | | 700/295 |
| 2016/0305992 A1* | 10/2016 | Yeo | H04W 4/80 |
| 2019/0006833 A1* | 1/2019 | Hall | G05B 15/02 |

* cited by examiner

POWER DROP ASSEMBLY WITH PROCESSOR AND MEMORY

RELATED APPLICATIONS

This application claims priority to U.S. Provisional Patent Application No. 62/526,523, filed Jun. 29, 2017, which is hereby incorporated by reference herein in its entirety.

FIELD OF THE INVENTION

This invention relates generally to the field of smart home devices, and more specifically to smart power devices.

BACKGROUND

Garages, workshops, warehouses, and the like, are common areas where tools, such as power tools are used. Tools are often electrically powered. Whether wired or wireless, electrical tools need to be connected to electrical power for some interval at time. In workspaces, it is often convenient to have power in spaces that are not necessarily nearby a wall mounted outlet. For these applications, drop down power receptacles (that are attached to an overhead outlet, for example) may be particularly beneficial.

SUMMARY OF THE INVENTION

In one aspect, the invention is a power drop assembly which includes a housing and a reel positioned and rotatable within it. A power cord connected at one end to the reel and has at least one power outlet attached thereto. The assembly also includes an electrical input and a switch between the electrical input the power cord. The switch is adapted to connect and disconnect the electrical input and the power cord. A controller, in communication with the switch, controls the switch. Power throttling circuitry controls the amount of current passing through the power cord.

The switch circuitry may include electrical usage circuitry for monitoring electrical usage of the power cord. The electrical input may include a power rail input. The electrical input may include a male power input. The electrical input may include a female power output.

The power drop assembly may further include a wireless transceiver communicatively connected to the controller. The power drop assembly may further include a motor mechanically attached to the reel. The motor may also be mechanically attached to the power cord housing.

The power drop assembly may further include a spring mechanically attached to the reel. The spring may also be mechanically attached to the power cord housing. The power drop assembly may further include a damper mechanically attached to the reel. The damper may also be mechanically attached to the power cord housing. The power drop assembly may further include a tilt lock mechanism mechanically attached to the reel. The tilt lock mechanism may also be mechanically attached to the power cord housing. The power drop assembly may further include a velocity lock mechanism mechanically attached to the reel. The velocity lock mechanism may also be mechanically attached to the power cord housing. The power drop assembly may further include a hose reel stopper mechanically attached to the power cord.

The power drop assembly may further include multiple female power outlets mechanically and electrically attached to the power cord. At least one of the multiple female power outlets may include a light attached to the at least one of the multiple female power outlets. The light may also be electrically connected to the power cord. At least one of the multiple female power outlets may include a sprinkler system attached to the at least one of the multiple female power outlets. The sprinkler system may also be electrically connect to the power cord.

The switch circuitry may include a circuit breaker. The circuit breaker may be a relay electrically connected to the controller. The power cord housing may include mounting brackets mechanically attached to a top portion of the power cord housing.

BRIEF DESCRIPTION OF THE DRAWINGS

A more particular description of the invention briefly described above is made below by reference to specific embodiments. Several embodiments are depicted in drawings included with this application, in which.

DETAILED DESCRIPTION

A detailed description of the claimed invention is provided below by example, with reference to embodiments in the appended figures. Those of skill in the art will recognize that components of the invention as described by example in the figures below could be arranged and designed in a wide variety of different configurations. Thus, the detailed description of the embodiments in the figures is merely representative of embodiments of the invention, and is not intended to limit the scope of the invention as claimed.

Numbering corresponding to the appended figures is provided, wherein like numbering corresponds to like embodiments. Each pair of ending numerals, of numbering corresponding to components of figures, indicates an example embodiment of a corresponding component. It should be understood that while each pair of ending numerals corresponds to a component of the invention, components belonging to separate figures may have differing configurations or functionality.

It is desirable to control electrical current and power to tools and other equipment. A smart power delivery assembly is described herein. Preferably, the assembly is designed to interconnect, via power or communication, to other smart home devices. The assembly provides power based on a programmable schedule of events for providing power. The assembly provides power consumption feedback of devices powered via the assembly. The assembly includes a circuit breaker to prevent overloading of the assembly and/or devices connected to the assembly.

Figure 1:
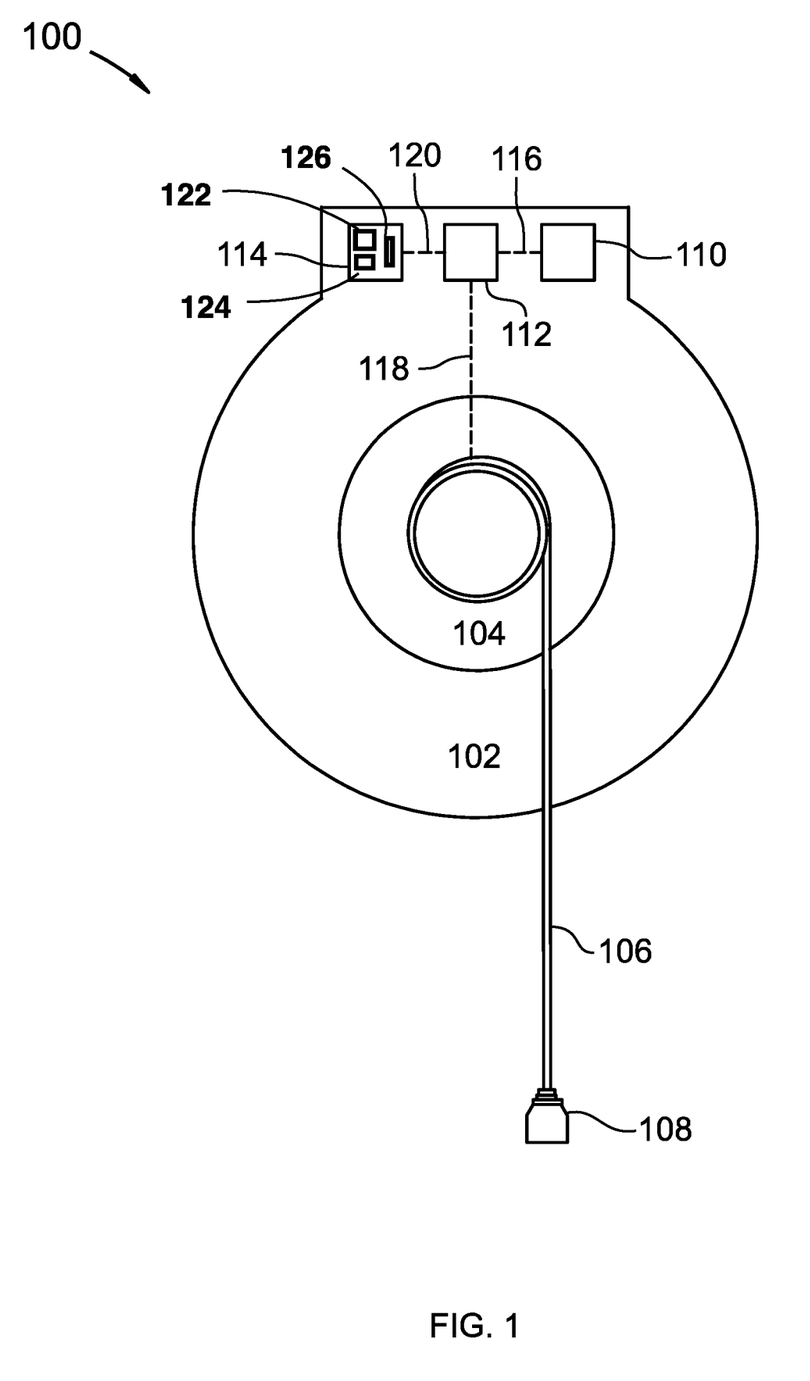
FIG. 1 is a front cut-away view of the power drop assembly.

FIG. 1 depicts a front cut-away view of a power drop assembly. Power drop assembly 100 includes power cord housing 102, reel 104, power cord 106, female power outlet 108, electrical input 110, switching circuitry 112, and controller 114. Reel 104 is positioned within and rotatably connected to power cord housing 102. Power cord 106 is mechanically attached to reel 104. Female power outlet 108 is mechanically and electrically attached to power cord 106. Switch circuitry 112 is electrically connected to electrical input 110. Switch circuitry 112 selectively, electrically connects electrical input 110 and power cord 106. Switch circuitry 112 is also electrically connected to power cord 106. Controller 114 is communicatively connected to switch circuitry 112 for controlling switch circuitry 112.

Electrical input 110 is electrically connected to switch circuitry 112 wirelessly or via wiring 116. Electrical input 110 and switch circuitry 112 each include wireless power transfer coils for inductive coupling of electrical input 110 and switch circuitry 112.

Power cord 106 is electrically connected to switch circuitry 112 via wiring 118. Switch circuitry 112 is communicatively connected to controller 114 wirelessly or via wire 120. Wiring 118 is connected with power cord 106 via a rotating electrical connector.

Electrical input 110 is electrically connected to a power source such as a power outlet. Instructions are sent from controller 114 to switch circuitry 112. Switch circuitry 112 subsequently allows or disallows electrical current to flow through electrical input 110 to power cord 106. An electrical device is electrically connected to female power outlet 108. While switch circuitry 112 allows current flow through power cord 106, the electrical device draws power from power cord 106 through female power outlet 108.

Controller 114 includes calendar instructions to send instructions to switch circuitry 112, to either allow or disallow current flow through power cord 106, according to hourly, daily, weekly, monthly, or yearly calendar instructions. For example, controller 114 includes calendar instructions which cause controller 114 to send instructions to switch circuitry 112 such that switch circuitry 112 allows current flow through power cord 106 during a first set of hours of day. Controller 114 also includes calendar instructions which cause controller 114 to send instructions to switch circuitry 112 such that switch circuitry 112 disallows current flow through power cord 106 during a second set of hours of day. Contained within controller 114 are non-transitory storage medium 122 (such as ROM, RAM, eMMC, SSD, HHD or other storage medium), a processor 124 (such as a CPU) and a wireless connection device 126 (Wi-Fi, Bluetooth, NFC or other wireless connection). Users have many options for controlling the power drop assembly. A user may set predetermined schedules for power at certain times of day or on certain days. These schedules are stored on the non-transitory storage medium 122. The processor then runs the programmed schedules. It is desirable to store these settings on the power drop assembly or in a cloud storage. There will often be multiple users of the power drop assembly. If the profiles and settings of the power drop assembly were stored on user's smart devices each user could have contradictory profiles and settings. By storing and managing the settings directly on the power cord assembly the multiple users will have a coordinated user profile and settings that will not contradict or interfere with one another and the settings for the power cord assembly. While having the processor and non-transitory storage within the power cord assembly, it is also possible to have the settings and schedules and user profiles stored in a cloud account. The wireless connection of the power drop assembly connects to the home wireless network and a cloud account can be created to store the user profiles and settings. In this way the multiple users will be able to use the same account and will not contradict or interfere with one another when changing settings or using the power drop assembly.

Some users will use the added security of having their settings and profiles along with all scheduling saved in both locations. The redundancy of having information stored in multiple locations creates peace of mind for those who fear losing information. In garages located in remote areas where internet connections are spotty or non-existent, having the processor 122 and non-transitory storage medium 124 as part of the power cord assembly becomes especially important. In these situations, there is no option to store the user profiles and settings to the cloud so the user profiles and settings must be stored and activated through the power cord assembly.

Reel 104 is rotatably connected to power cord housing 102 with any of a variety of means, including ball bearing(s), roller bearing(s), or journal bearing(s).

Figure 2:
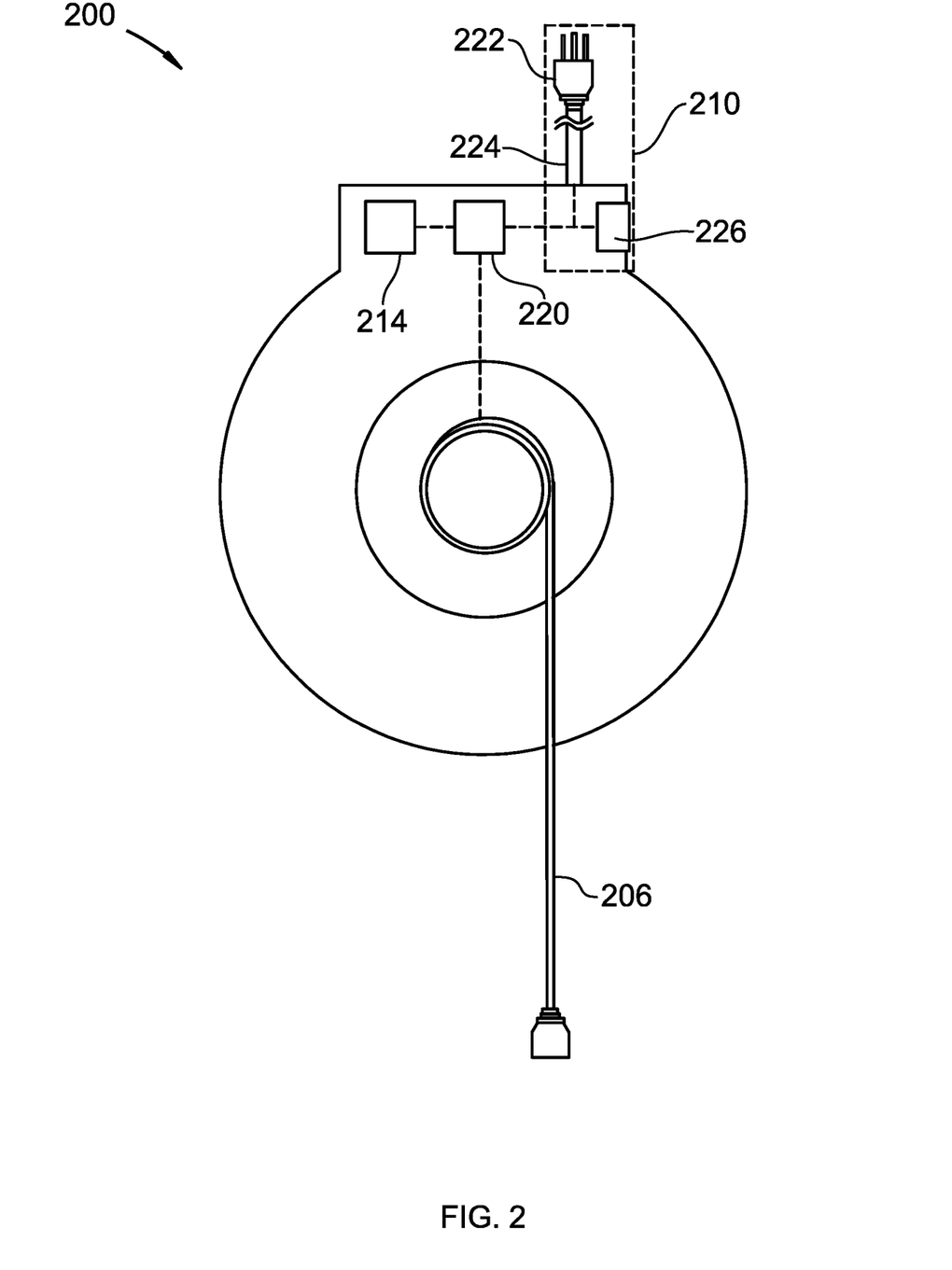
FIG. 2 is a front cut-away view, having a power throttling circuitry.

FIG. 2 depicts an embodiment similar to FIG. 1 with power throttling circuitry. Power drop assembly 200 further includes power throttling circuitry 220. Power throttling, also known as current limiting is the process of keeping the electrical current at or below a predetermined threshold. This threshold, becomes the upper limit, or the maximum amount off electrical current allowed through the circuit. There are several examples of throttling or current limiting circuits, in one such circuit, there are several components; a pass or output transistor, a load current sensing device, a protection transistor. A current is applied to the circuit travelling through the output transistor, when current to the load sensing device exceeds the upper limit for current load, the protection transistor is turned on. The excess current then travels down the protection transistor and the output through the output transistor is maintained at or below the predetermined threshold. In this way the circuit limits the current output, or throttles down the power.

Power throttling circuitry 220 is electrically connected to power cord 206. Power throttling circuitry 220 allows variable amounts of current to be passed through the power cord 206. For example, when current passing through power throttling circuitry 220 begins to exceed a preset current threshold, the power throttling circuitry 220 is activated and limits current passing through power throttling circuitry 220 to below or at the preset current threshold. Controller 214 is communicatively connected to power throttling circuitry. Controller 214 sends instructions to power throttling circuitry 220 and power throttling circuitry 220 limits an amount of current flow across power throttling circuitry 220 in accordance with the instructions sent by controller 214. Controller 214 receives current flow data from power throttling circuitry 220. Controller 214 instructs power throttling circuitry 220 to limit current flow based on any of a number of criteria, including time of day, time of week, time of month, or time of year.

Electrical input 210 includes male power input 222. Male power input 222 includes power input cord 224. Electrical input 210 includes female power output 226. Female power output 226 allows for multiples of power drop assembly 200 to be electrically connected in a daisy chain, where a daisy chain is an electrical connection scheme in which multiple devices are electrically connected together in sequence or in a ring.

Figure 3:
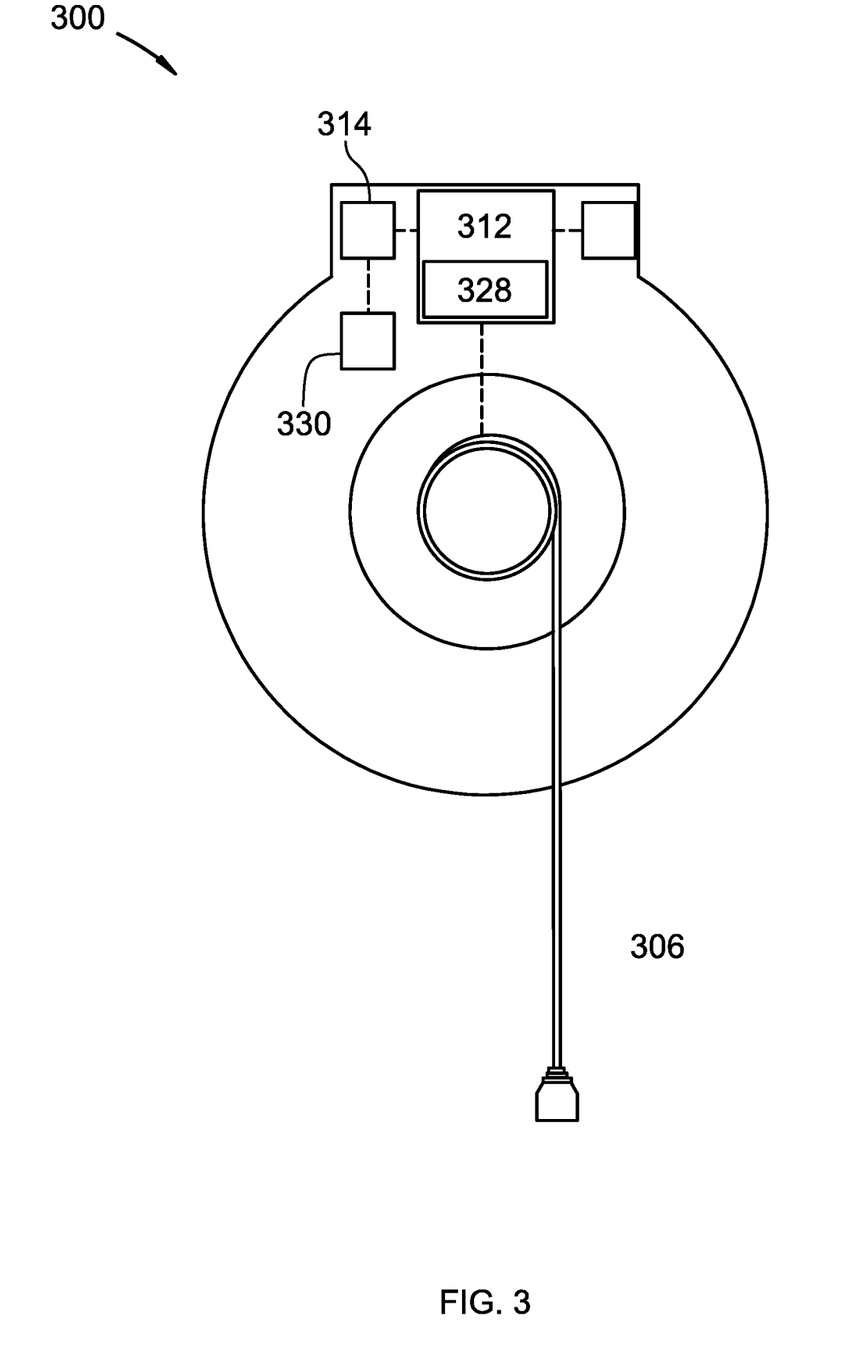
FIG. 3 is a front cut-away view with electrical usage circuitry.

FIG. 3 depicts an embodiment similar to FIG. 1 with electrical usage circuitry. Switch circuitry 312 of power drop assembly 300 includes electrical usage circuitry 328 for monitoring electrical usage of power cord 306. Power drop assembly 300 further includes wireless transceiver 330. Wireless transceiver 330 is communicatively connected to controller 314.

Electrical usage circuitry 328 collects electrical usage data corresponding to current through, electrical impedance of, phase shift of electrical current through, and potential difference across switching circuitry 312. Electrical usage circuitry 328 subsequently sends the electrical usage data to controller 314. Controller 314 stores the electrical usage data. Controller 314 sends the electrical usage data to a peripheral device of a user via wireless transceiver 330. The user subsequently accesses the electrical usage data via the peripheral device. The mentioned peripheral device may be any of a variety of smart devices, including a smart phone, a tablet, or a laptop. Electrical usage data includes a timestamp from a time when it is collected by electrical usage circuitry 328 or from a time when it is received by controller 314.

In some embodiments, the electrical usage data is analyzed to identify patterns and usage characteristics. The identified patterns and usage characteristics are compared and analyzed with respect to other data (e.g., proximity sensor data, schedule data, etc.) to determine predicted usage schedules. These predicted usage schedules enable operation where the power drop assembly 300 learns and anticipates needs. This learning behavior is optimized for reducing power consumption, for optimizing battery performance (of powered devices, for example), for providing access control, and the like. In some embodiments, long term electrical usage data is used to determine maintenance and replacement notifications for particular powered devices.

Figure 4:
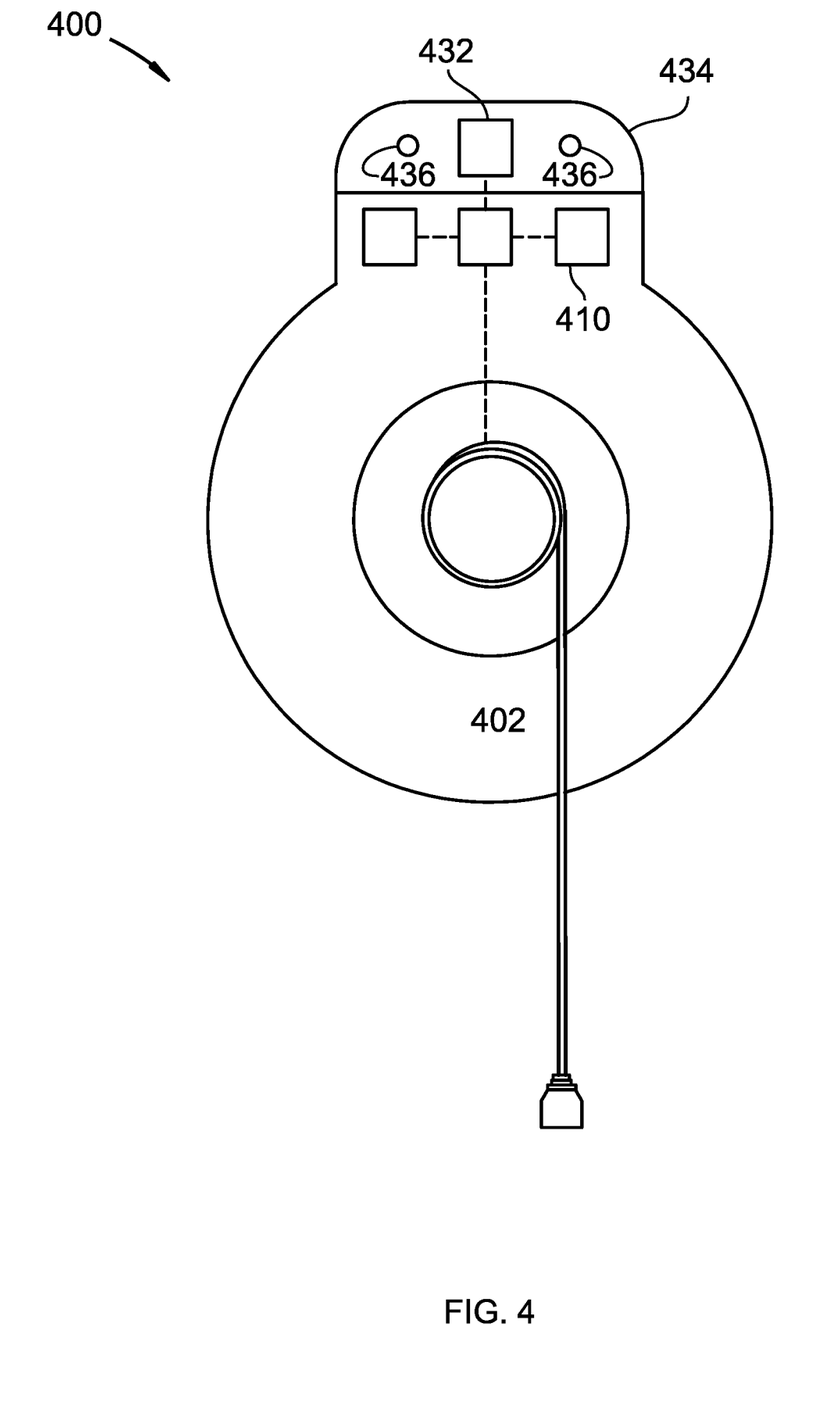
FIG. 4 is a front cut-away view with a power rail input.

FIG. 4 depicts an embodiment similar to FIG. 1 with a power rail input. Electrical input 410 of power drop assembly 400 includes power rail input 432. Power cord housing 402 includes mounting brackets 434 mechanically attached to a top portion of power cord housing 402. Power rail input 432 receives electrical current via a powered rail. Power rail input 432 receives power using any of a variety of means, including wireless power transfer or wired power transfer.

Mounting brackets 434 include apertures 436 used to mount to a bracket attached to a support structure. For example, a rail is attached to a ceiling of a room. Mounting brackets 434 are fixed to the rail using pins attached to the rail and inserted into apertures 436. Furthermore, the pins are electrically connected to a power source via the rail. The power source transfers electrical current to power rail input 432 via said pins.

Figure 5:
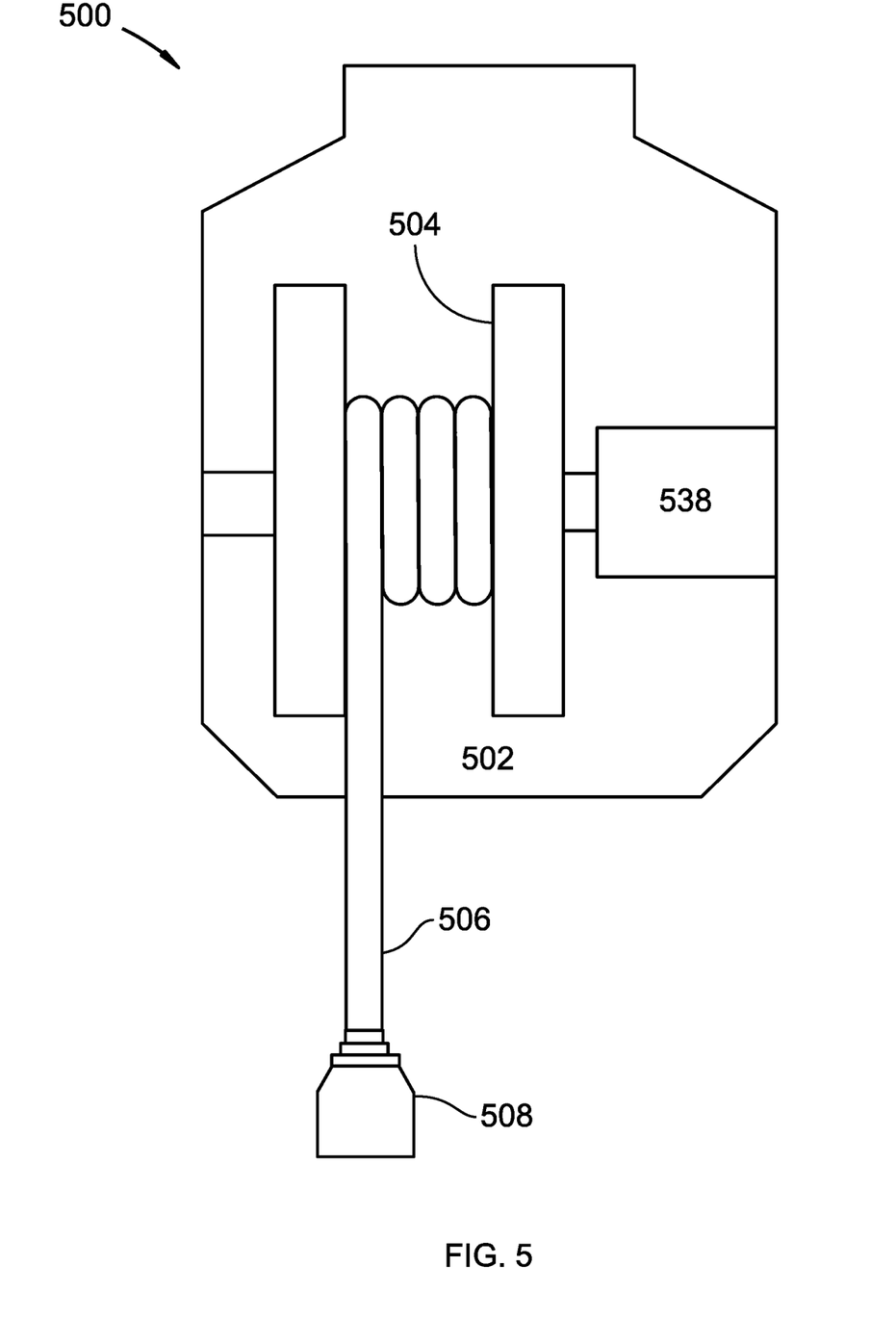
FIG. 5 is a side cut-away view of a power drop assembly.

FIG. 5 depicts a side cut-away view of a power drop assembly. Power drop assembly 500 includes motor 538 mechanically attached to reel 504 and mechanically attached to power cord housing 502. Motor 538 turns reel 504 such that power cord 506 coils or uncoils around reel 504; subsequently, female power outlet 508 raises or lowers, respectively.

Figure 6:
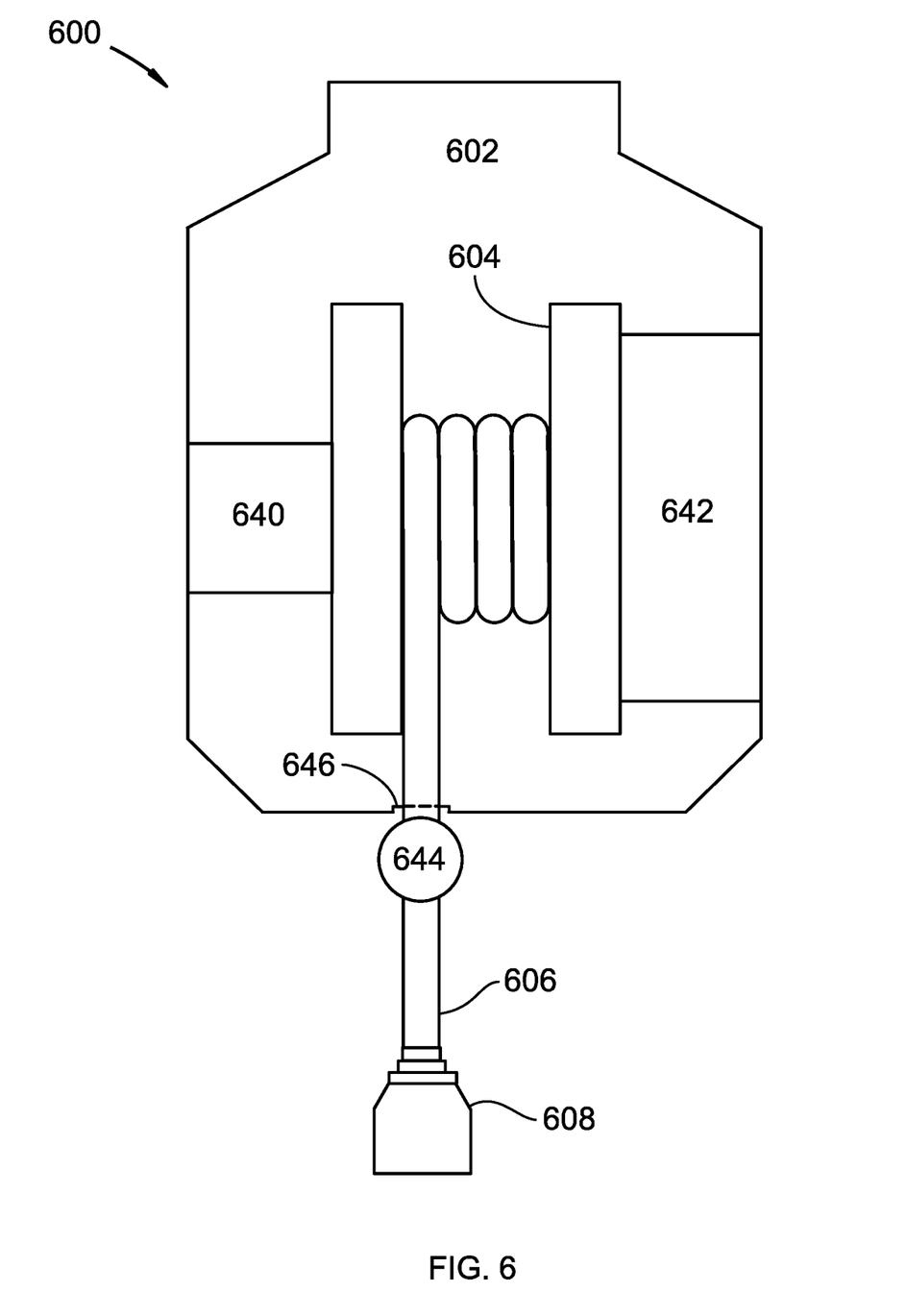
FIG. 6 is a side cut-away view with a spring.

FIG. 6 depicts an embodiment similar to FIG. 5 with a spring. Power drop assembly 600 includes spring 640 mechanically attached to reel 604. Spring 640 is also mechanically attached to power cord housing 602. Spring 640 stores mechanical energy as power cord 606 is uncoiled from reel 604, angularly displacing reel 604. In one embodiment spring 640 is a rotational spring.

For example, female power outlet 608 is pulled with a force away from power cord housing 602. Power cord 606 is subsequently pulled in a direction corresponding to the force such that power cord 606 is uncoiled from reel 604. Spring 640 stores energy and induces tension in power cord 606 as a function of angular displacement of reel 604. If the force is released, then the tension in power cord 606 and the energy stored in spring 640 causes reel 604 to angularly displace and power cord 606 to re-coil about reel 604. Spring 640 stores energy as a linear or non-linear function of angular displacement of reel 604.

Power drop assembly 600 further includes damper 642 mechanically attached to reel 604. Damper 642 is mechanically attached to power cord housing 602. In one embodiment damper 642 is a rotational damper. Damper 642 dissipates energy and induces tension in power cord 606 as a function of angular velocity of reel 604. For example, female power outlet 608 is pulled with a force away from power cord housing 602. Power cord 606 is subsequently pulled in a direction corresponding to the force such that power cord 606 is uncoiled from reel 604. Spring 640 stores energy and induces tension in power cord 606 as a function of angular displacement of reel 604. Damper 642 dissipates energy and induces tension in power cord 606 as a function of angular velocity of reel 604. If the force is released, then the tension in power cord 606 and the energy stored in spring 640 causes reel 604 to angularly displace and power cord 606 to recoil about reel 604. Subsequently, damper 642 dissipates energy as a function of angular velocity of reel 604 and damper 642 causes power cord 606 to coil about reel 604 with decreased angular velocity.

Damper 642 actuates when reel 604 is rotated in a first direction, and damper 642 does not actuate when reel 604 is rotated in a second direction. The first direction is rotationally opposite the second direction. For example, power cord 606 is uncoiled from reel 604, which causes reel 604 to be rotated in the first direction. Subsequently, while power cord 606 is uncoiled from reel 604, damper 642 does not actuate.

Power drop assembly 600 further includes hose reel stopper 644 mechanically attached to power cord 606. Power cord 606 passes through aperture 646 in power cord housing 602. Hose reel stopper 644 prevents power cord 606 from coiling about reel 604 by having geometry which cannot pass through aperture 646 of power cord housing 602. In one embodiment hose reel stopper 644 has geometry which is spherical having a diameter of a greater magnitude than a width, length, or thickness belonging to aperture 646. Hose reel stopper 644 is adjustable to be moved to different locations along power cord 606.

Figure 7:
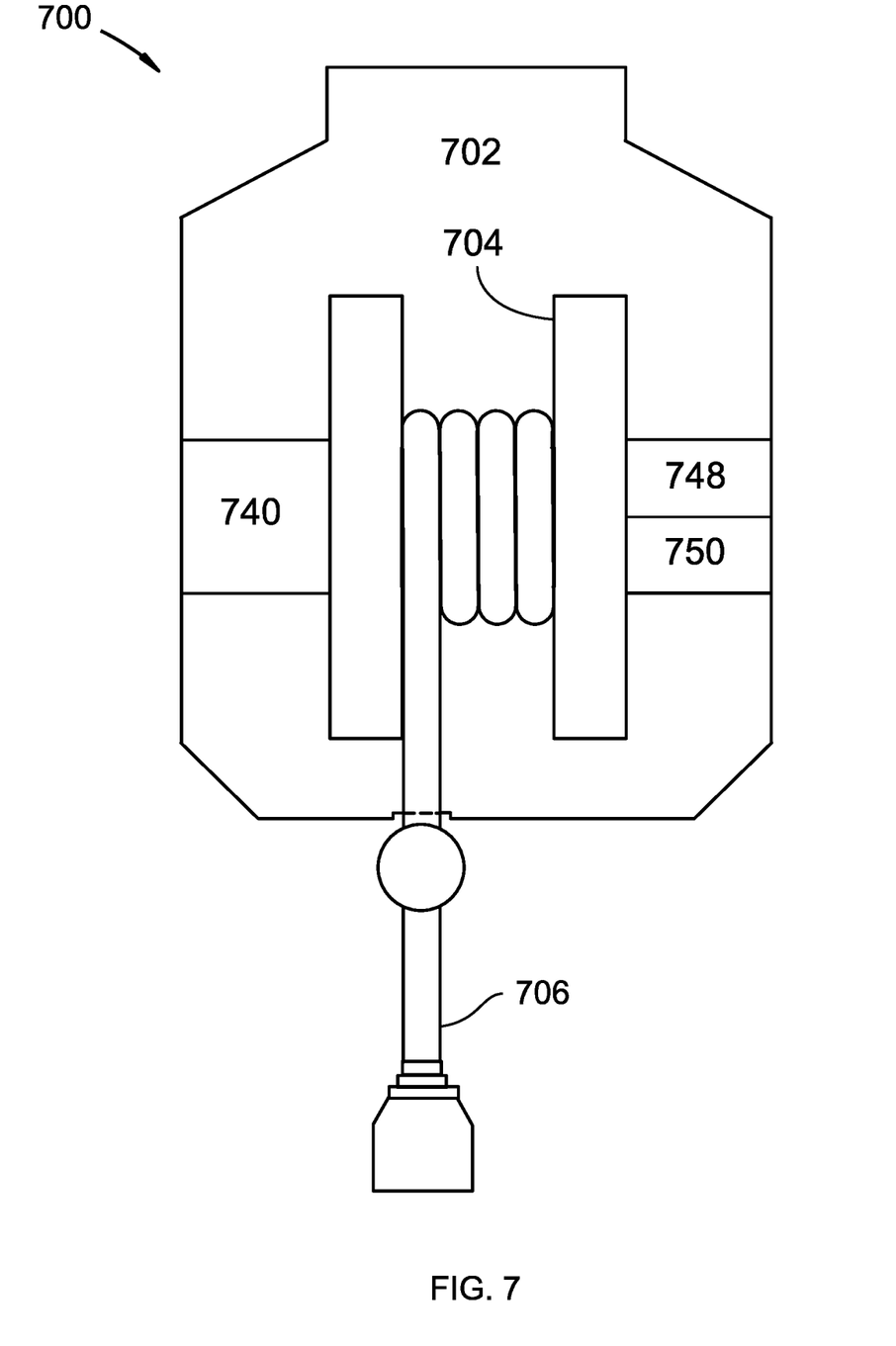
FIG. 7 is a side cut-away view with a lock mechanism.

FIG. 7 depicts an embodiment similar to FIG. 6 with a lock mechanism. Power drop assembly 700 includes tilt lock mechanism 748 mechanically attached to reel 704. Tilt lock mechanism 748 is also mechanically attached to power cord housing 702. Tilt lock mechanism 748 engages or disengages to, respectively, disallow or allow reel 704 to angularly displace. Tilt lock mechanism 748 engages or disengages based upon translational acceleration of reel 704 with respect to power cord housing 702. For example, a force is used to pull power cord 706 such that power cord 706 is at an angle, with a magnitude greater than a preset angle value, with respect to vertical (where vertical may mean a direction oriented with acceleration due to gravity). The force on power cord 706 causes reel 704 to accelerate along a horizontal direction (where horizontal direction may mean a direction perpendicular to vertical), engaging tilt lock mechanism 748. If the force is removed, tilt lock mechanism 748 remains engaged until power cord 706 is uncoiled by an amount from reel 704. Spring 740 coils power cord 706 in absence of the force, while tilt lock mechanism 748 is disengaged.

Power drop assembly 700 includes velocity lock mechanism 750 mechanically attached to reel 704. Velocity lock mechanism 750 is also be mechanically attached to power cord housing 702. Velocity lock mechanism 750 engages or disengages to, respectively, disallow or allow reel 704 to angularly displace. Velocity lock mechanism 750 engages or disengages based upon translational velocity of reel 704 with respect to power cord housing 702. For example, a force is used to pull power cord 706. The force on power cord 706 causes reel 704 to have an angular velocity above a preset angular velocity threshold, causing velocity lock mechanism 750 to engage. If the force is removed, velocity lock mechanism 750 remains engaged until power cord 706 is uncoiled by an amount from reel 704. Spring 740 coils power cord 706 in absence of the force, while velocity lock mechanism 750 is disengaged.

Figure 8:
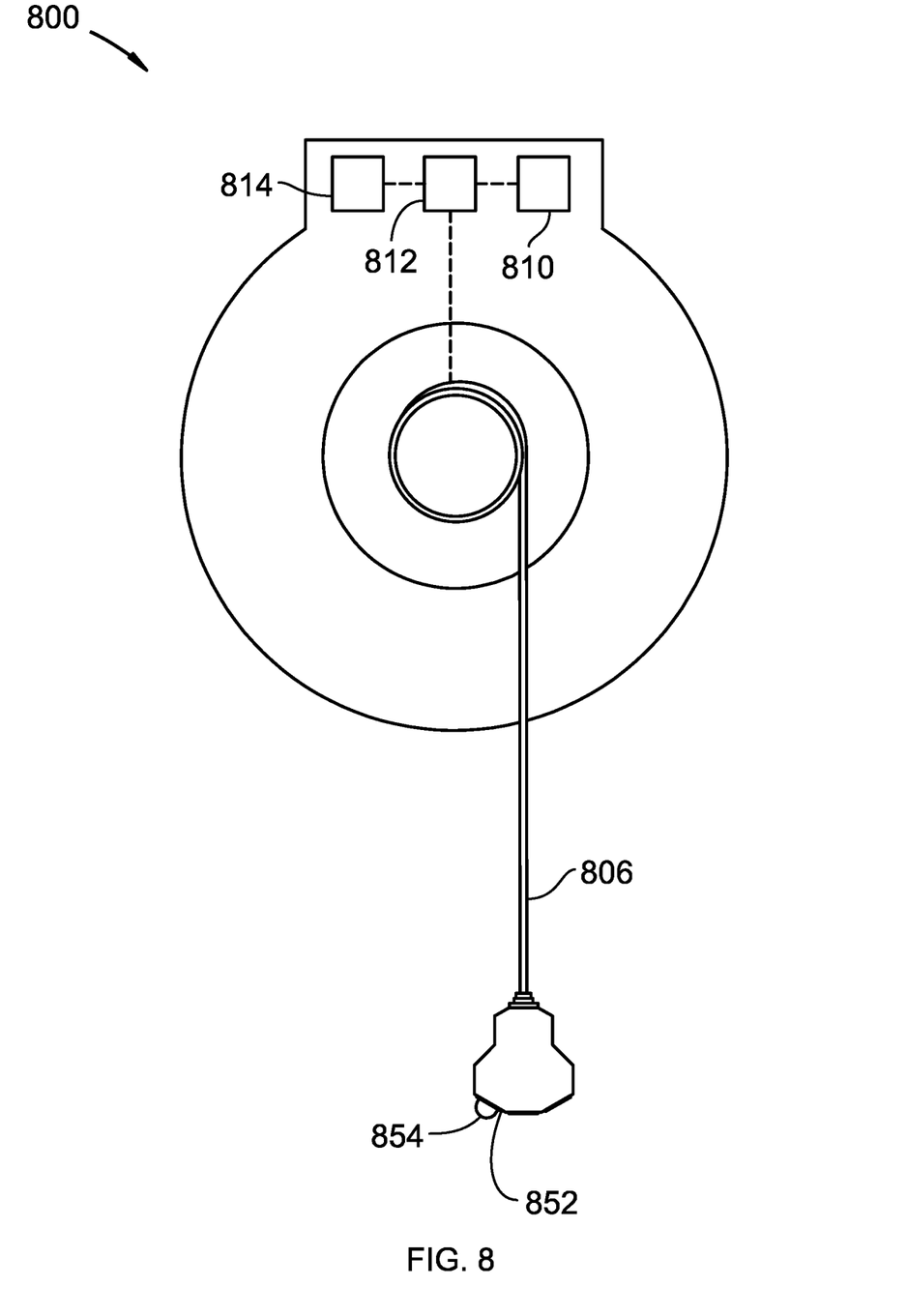
FIG. 8 a front cut-away view with a light.

FIG. 8 depicts an embodiment similar to FIG. 1 with a light. Power drop assembly 800 includes multiple female power outlets 852 mechanically and electrically attached to power cord 806. At least one of multiple female power outlets 852 includes light 854 attached to the at least one of multiple female power outlets 852. Light 854 is electrically connected to power cord 806. Light 854 may be any of a variety of lights, including a light emitting diode (LED), an incandescent light, an arc light, or a laser light.

Switch circuitry 812 selectably connects electrically to each of multiple female power outlets 852 via power cord 806 and electrical input 810. Controller 814 instructs switch circuitry 812 to allow electrical current from electrical input 810 to flow to all of multiple female power outlets 852. Controller 814 instructs switch circuitry 812 to allow electrical current from electrical input 810 to flow to one, multiple, or none of multiple female power outlets 852. For example, Controller 814 instructs switch circuitry 812 to allow electrical current from electrical input 810 to flow to the at least one of multiple female power outlets 852, and subsequently to light 854, while disallowing electrical current from electrical input 810 to flow to any other of multiple power outlets 852.

Figure 9:
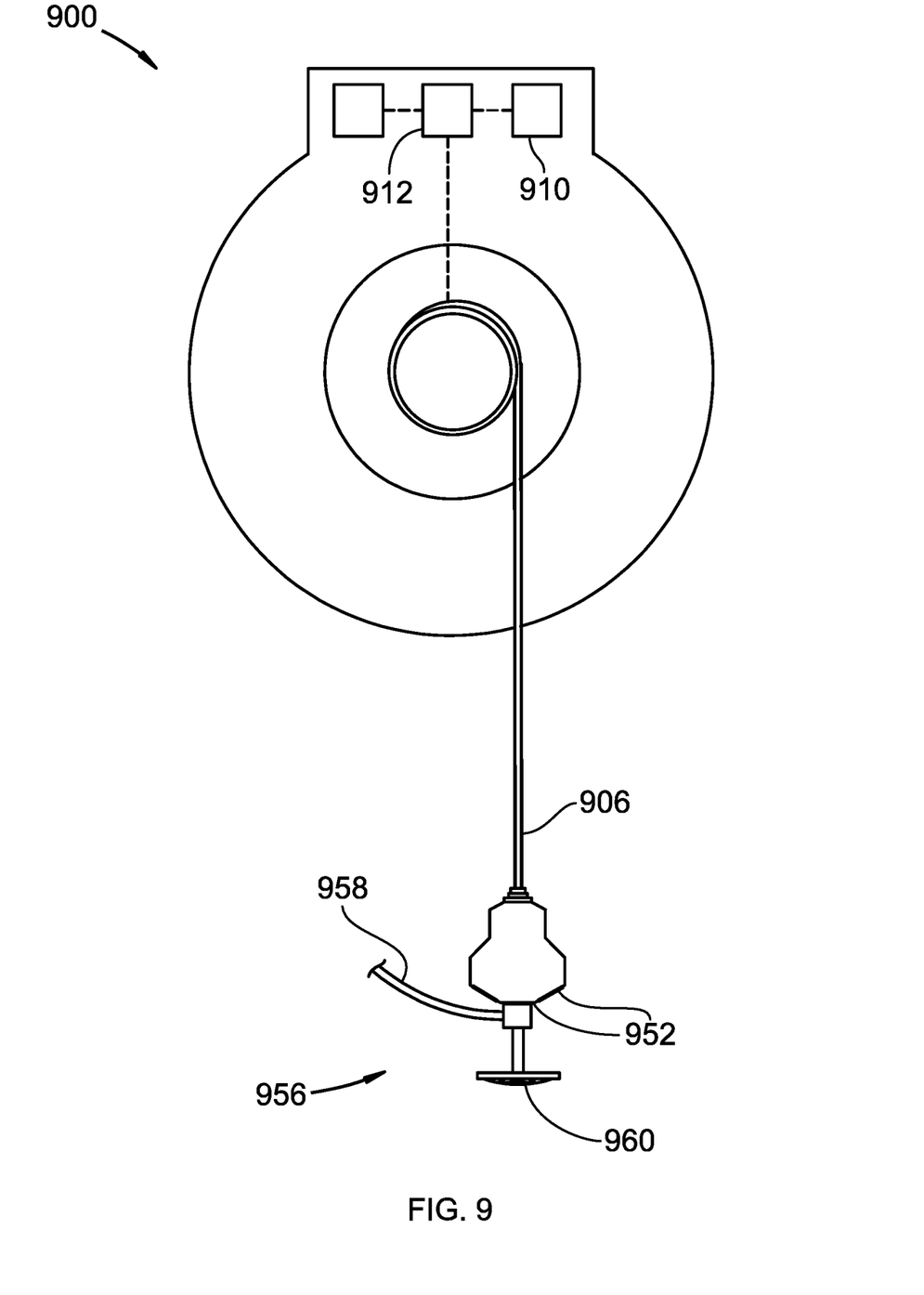
FIG. 9 is a front cut-away view with a sprinkler.

FIG. 9 depicts an embodiment similar to FIG. 8 with a sprinkler. Power drop assembly 900 includes multiple female power outlets 952. At least one of multiple female power outlets 952 includes sprinkler system 956 attached to the at least one of multiple female power outlets 952. Sprinkler system 956 is also electrically connected to power cord 906.

Sprinkler system 956 includes water supply line 958 and sprinkler 960. Sprinkler 960 is fluidly connected with water supply line 958 such that sprinkler 960 draws water from water supply line 958 and sprinkle said water. Sprinkler system 956 actuates to sprinkle water when the at least one of multiple female power outlets 952 receives current flow or a electrical potential difference from electrical input 910 via switch circuitry 912 and power cord 906.

Figure 10:
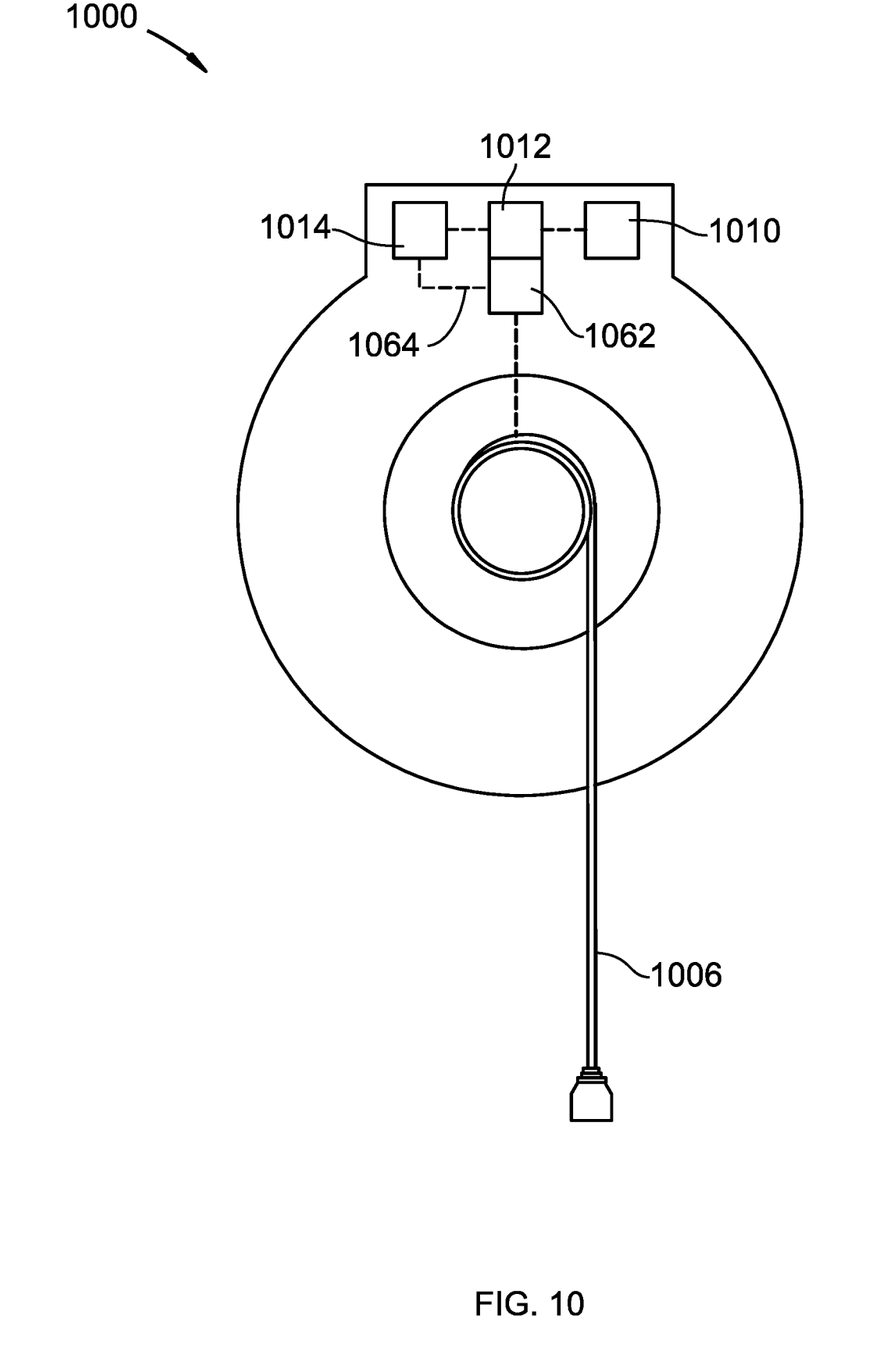
FIG. 10 is a front cut-away view with a circuit breaker.

FIG. 10 depicts an embodiment similar to FIG. 1 with a circuit breaker. Switch circuitry 1012 of power drop assembly 1000 includes circuit breaker 1062. Circuit breaker 1062 connects electrical input 1010 to power cord 1006. Circuit breaker 1062 disallows electrical current to flow from electrical input 1010 to power cord 1006 if a magnitude of electrical current flowing through circuit breaker 1062 is greater than a preset current flow threshold. In some embodiments circuit breaker 1062 is reset manually or via switch circuitry 1012. For example, a magnitude of electrical current flowing through circuit breaker 1062 greater than the preset electrical current flow threshold, circuit breaker 1062 disallows current to flow from electrical input 1010 to power cord 1006. Switch circuitry 1012 subsequently sends circuit breaker state data to controller 1014. Controller 1014 processes the circuit breaker state data. Controller 1014 alerts a user that circuit breaker 1062 has disallowed current flow from electrical input 1010 to power cord 1006. Controller 1014 receives instructions from the user. Controller 1014 sends restart instructions to circuit breaker 1062. Circuit breaker 1062 subsequently allows electrical current to flow from electrical input 1010 to power cord 1006. Controller 1014 is programmed to automatically send restart instructions to circuit breaker 1062. In certain embodiments the automatic reset is programmed to occur after a preset period of time. In certain embodiments the controller 1014 is programmed to lock down the circuit breaker until the user enters password information. In certain embodiments circuit breaker 1062 is a relay electrically connected to controller 1014 via wiring 1064. Controller 1014 applies an electrical current and/or an electrical potential difference across wiring 1064 such that circuit breaker 1062 disallows or allows electrical current to flow from electrical input 1010 to power cord 1006.

Controller 114 also includes calendar instructions which cause controller 114 to send instructions to switch circuitry 112 such that switch circuitry 112 disallows current flow through power cord 106 during a second set of hours of day. Contained within controller 114 are non-transitory storage medium 122 (such as ROM, RAM, eMMC, SSD, HHD or other storage medium), a processor 124 (such as a CPU) and a wireless connection device 126 (Wi-Fi, Bluetooth, NFC or other wireless connection). Users have many options for controlling the power drop assembly. A user may set predetermined schedules for power at certain times of day or on certain days. These schedules are stored on the non-transitory storage medium 122. The processor then runs the programmed schedules. It is desirable to store these settings on the power drop assembly or in a cloud storage. There will often be multiple users of the power drop assembly. If the profiles and settings of the power drop assembly were stored on user's smart devices each user could have contradictory profiles and settings. By storing and managing the settings directly on the power cord assembly the multiple users will have a coordinated user profile and settings that will not contradict or interfere with one another and the settings for the power cord assembly. While having the processor and non-transitory storage within the power cord assembly, it is also possible to have the settings and schedules and user profiles stored in a cloud account. The wireless connection of the power drop assembly connects to the home wireless network and a cloud account can be created to store the user profiles and settings. In this way the multiple users will be able to use the same account and will not contradict or interfere with one another when changing settings or using the power drop assembly. Some users will use the added security of having their settings and profiles along with all scheduling saved in both locations. The redundancy of having information stored in multiple locations creates peace of mind for those who fear losing information. In garages located in remote areas where internet connections are spotty or non-existent, having the processor 122 and non-transitory storage medium 124 as part of the power cord assembly becomes especially important. In these situations, there is no option to store the user profiles and settings to the cloud so the user profiles and settings must be stored and activated through the power cord assembly.

We claim:
1. A power drop assembly comprising:
   a housing;
   a reel positioned and rotatable within the housing;
   a power cord connected at one end to the reel;
   at least one power outlet attached to the power cord;
   an electrical input;

a switch between the electrical input and the power cord, wherein the switch is adapted to connect and disconnect the electrical input and the power cord; and a controller in communication with the switch, wherein the switch receives instructions from the controller; and power throttling circuitry for controlling the amount of current passing through the power cord;

non-transitory storage medium for storing multiple user profiles and multiple user preferences within each user profile;

a processor;

wherein the processor manages the user preferences of each user profile to coordinate the user preferences to overcome any contradiction or interference between the user preferences of the multiple user profiles for controlling the amount of current passing through the power cord;

wherein the electrical input includes a female power output which is separate from the switch between the electrical input and the power cord and is configured to allow multiple power drop assemblies to be electrically connected in a daisy chain.

2. The power drop assembly of claim 1, further comprising a wireless transceiver connected to the controller.

3. The power drop assembly of claim 2, wherein a smart device connects to the controller via the wireless transceiver.

4. A power drop assembly comprising:

a housing;

a reel positioned and rotatable within the housing;

a power cord connected at one end to the reel;

at least one power outlet attached to the power cord;

an electrical input;

a switch between the electrical input and the power cord, wherein the switch is adapted to connect and disconnect the electrical input and the power cord; and a controller in communication with the switch, wherein the switch receives instructions from the controller;

power throttling circuitry for controlling the amount of current passing through the power cord;

a wireless transceiver connected to the controller;

a processor and non-transitory storage medium;

a smart device connected to the controller;

non-transitory storage medium for storing user profiles and user preferences within each user profile;

a processor;

wherein the processor manages the user preferences of each user profile to coordinate the user preferences to overcome any contradiction or interference between the user preferences of the multiple user profiles for controlling the amount of current passing through the power cord;

wherein the controller allows or disallows current flow through the power cord according to calendar instructions;

wherein the electrical input includes a female power output which is separate from the switch between the electrical input and the power cord and is configured to allow multiple power drop assemblies to be electrically connected in a daisy chain.

5. The power drop assembly of claim 4, wherein the non-transitory storage medium stores a program for interaction with the power drop assembly.

6. The power drop assembly of claim 5, wherein the processor activates and runs programs stored on the non-transitory storage medium.

7. The power drop assembly of claim 5, wherein a user can schedule the power available to the at least one power outlet through the program stored on the non-transitory storage medium.

8. The power drop assembly of claim 5, wherein a user can view on a smart device a maintenance schedule for the devices attached to the at least one power outlet through a program stored on the non-transitory storage medium.

9. The power drop assembly of claim 5, wherein a user can select optimization criteria.

10. The power drop assembly of claim 5, wherein a user can select options for optimizing the reducing of power consumption.

11. The power drop assembly of claim 10, wherein the controller learns and anticipates the power needs of the at least one power outlet.

12. The power drop assembly of claim 5, wherein a user can select increased battery life optimization for attached devices.

13. A power drop assembly comprising:

a housing;

a reel positioned and rotatable within the housing;

a power cord connected at one end to the reel;

at least one power outlet attached to the power cord;

an electrical input;

a switch between the electrical input and the power cord, wherein the switch is adapted to connect and disconnect the electrical input and the power cord; and a controller in communication with the switch, wherein the switch receives instructions from the controller;

power throttling circuitry for controlling the amount of current passing through the power cord;

a wireless transceiver connected to the controller;

a processor and non-transitory storage medium;

a cloud account for storing user and power drop information and settings;

a smart device connected to the controller;

non-transitory storage medium for storing user profiles and user preferences within each user profile;

a processor;

wherein the processor manages the user preferences of each user profile to coordinate the user preferences to overcome any contradiction or interference between the user preferences of the multiple user profiles for controlling the amount of current passing through the power cord;

wherein the controller allows or disallows current flow through the power cord according to calendar instructions;

wherein the electrical input, includes a female power output which is separate from the switch between the electrical input and the power cord and is configured to allow multiple power drop assemblies to be electrically connected in a daisy chain.

14. The power drop assembly of claim 13, wherein the processor activates and runs programs stored on the cloud account.

15. The power drop assembly of claim 14, wherein a user can schedule the power available to the at least one power outlet through the program stored on the cloud account.

16. The power drop assembly of claim 14, wherein a user can view on a smart device a maintenance schedule for the devices attached to the at least one power outlet through a program stored on the cloud account.

17. The power drop assembly of claim 14, wherein a user can select optimization criteria.

18. The power drop assembly of claim 14, wherein a user can select options for optimizing the reducing of power consumption.

19. The power drop assembly of claim 14, wherein a user can select increased battery life optimization for attached devices.

20. The power drop assembly of claim 14, wherein the program predicts the power needs of the at least one power outlet and schedules the power availability to the at least one power outlet.

\* \* \* \* \*